US012605805B2

(12) United States Patent
Strauch

(10) Patent No.: US 12,605,805 B2
(45) Date of Patent: Apr. 21, 2026

(54) SCREWING TOOL

(71) Applicant: Wera Werkzeuge GmbH, Wuppertal (DE)

(72) Inventor: Martin Strauch, Wuppertal (DE)

(73) Assignee: Wera Werkzeuge GmbH, Wuppertal (DE)

( * ) Notice: Subject to any disclaimer, the term of this patent is extended or adjusted under 35 U.S.C. 154(b) by 347 days.

(21) Appl. No.: 18/269,311

(22) PCT Filed: Jan. 24, 2022

(86) PCT No.: PCT/EP2022/051484

§ 371 (c)(1),
(2) Date: Jun. 23, 2023

(87) PCT Pub. No.: WO2022/157355

PCT Pub. Date: Jul. 28, 2022

(65) Prior Publication Data

US 2024/0051092 A1 Feb. 15, 2024

(30) Foreign Application Priority Data

Jan. 25, 2021 (DE) ..................... 10 2021 101 503.0

(51) Int. Cl.
*B25B 13/18* (2006.01)
*B25B 23/00* (2006.01)
*B25G 1/12* (2006.01)

(52) U.S. Cl.
CPC .......... *B25B 13/18* (2013.01); *B25B 23/0028* (2013.01); *B25G 1/125* (2013.01)

(58) Field of Classification Search
CPC ......... B25B 13/08; B25B 13/10; B25B 13/12; B25B 13/16; B25B 13/18; B25B 13/28; B25B 13/32; B25B 13/46; B25B 13/48; B25B 13/505; B25B 13/5058; B25B 13/56; B25B 23/0007; B25B 23/0028;
(Continued)

(56) References Cited

U.S. PATENT DOCUMENTS 1,924,393 A * 8/1933 Beery ................. B25B 13/5058 81/90.1
5,746,097 A * 5/1998 McCann ................. B25B 13/28 81/97
6,131,491 A * 10/2000 Hirse ...................... B25B 13/12 81/126

FOREIGN PATENT DOCUMENTS

CN 109129279 A 1/2019
DE 102018113478 A1 * 12/2019 ............. B25B 13/46
WO 97/36717 A1 10/1997

OTHER PUBLICATIONS

International Search Report in PCT/EP2022/051484, mailed May 11, 2022.

* cited by examiner

*Primary Examiner* — Robert J Scruggs
(74) *Attorney, Agent, or Firm* — Collard & Roe, P.C.

(57) ABSTRACT

A screwing tool includes a head, which has a fixed jaw and a movable jaw and which is fastened to a handle so as to be pivotable about a pivot axis against a restoring force from a small distance position of the two jaws into a large distance position of the two jaws. In order to be able to touch live parts by means of a screwing tool of this type, the handle has an insulating casing and an actuating element is provided, which can be displaced relative with respect to the handle and which, during its displacement, displaces the head from the small distance position into the large distance position.

9 Claims, 3 Drawing Sheets

(58) Field of Classification Search
CPC ..... B25B 23/0071; B25B 23/16; B25G 1/125; B25G 3/00; B25G 3/38; B25F 1/003; B25F 1/02
See application file for complete search history.

Fig. 1
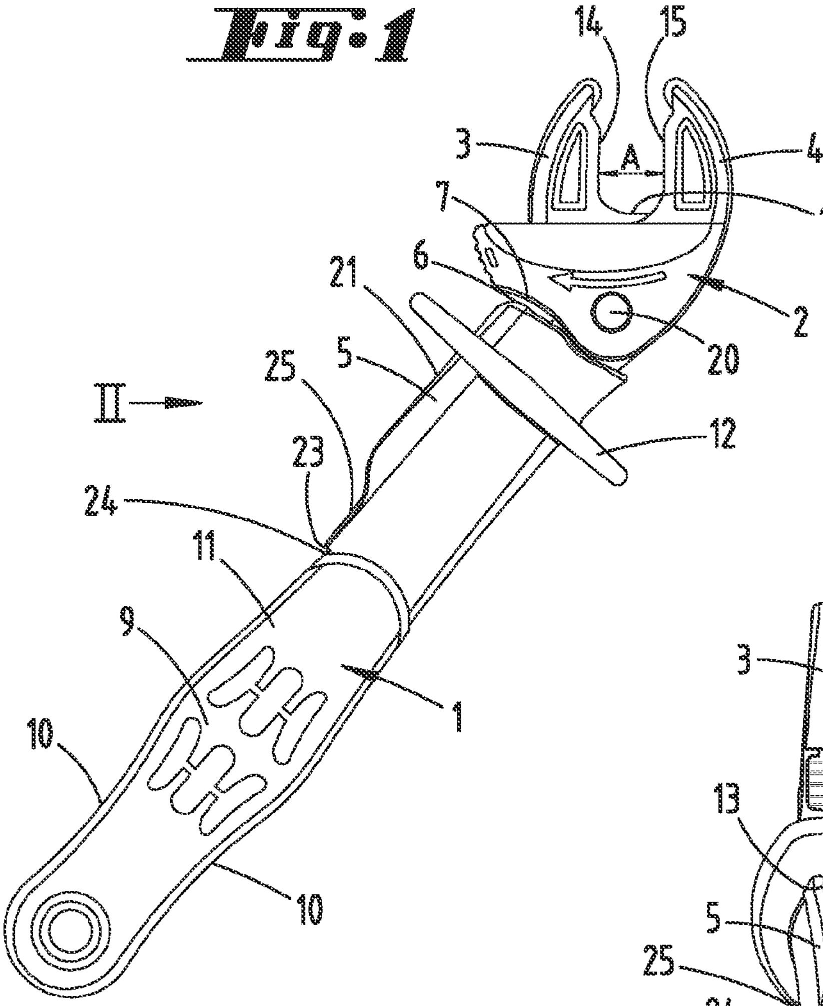
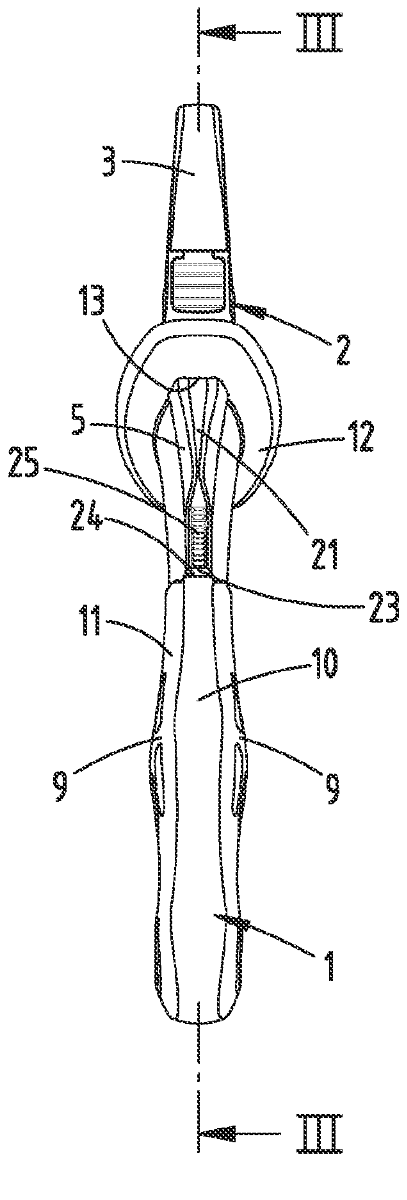
Fig. 2

SCREWING TOOL

CROSS REFERENCE TO RELATED APPLICATIONS

This application is the National Stage of PCT/EP2022/051484 filed on Jan. 24, 2022, which claims priority under 35 U.S.C. § 119 of German Application No. 10 2021 101 503.0 filed on Jan. 25, 2021, the disclosure of which is incorporated by reference. The international application under PCT article 21(2) was not published in English.

FIELD OF TECHNOLOGY

The invention relates to a screwing tool comprising a head, which has a fixed jaw and a movable jaw and which is fastened to a handle so as to be pivotable about a pivot axis against a restoring force from a small distance position of the two jaws into a large distance position of the two jaws.

PRIOR ART

A screwing tool of this type if already known, for example, from DE 10 2018 113 478 A1.

In the case of a generic screwing tool, an elongate handle carriers a head, which is articulated on the handle so as to be pivotably movable about a pivot axis in such a way that, accompanied by the pivoting of the head, the distance between handle flanks of the two jaws is changed. The head is thereby connected to the handle via a gearing in such a way that a force is applied to the two handle flanks towards one another, accompanied by a torque applied to the handle, so that hexagonal screw heads or nuts with different widths across flats can be released or tightened by means of the screwing tool. A spring force is applied to the movable jaw by means of a spring element in the direction of the fixed jaw. Accompanied by this, the spring element biases the head into a first pivot position, which corresponds to the small distance position of the two jaws. In order to grip a nut or a screw head with a larger distance position of the two jaws, the head, starting at the first pivot position, has to be brought into a second pivot position, in which the two handle flanks of the jaws have moved away from one another.

So-called "monkey wrenches" are further known from the prior art, in the case of which the handle flanks of the jaws can be brought into a different distance position by means of an actuating element.

Screwing tools are further known from the prior art, which have a handle comprising an electrically insulating casing, so that live screws or nuts can be rotated by means of the screwing tool.

SUMMARY OF THE INVENTION

The invention is based on the object of further developing the generic screwing tool in a manner, which is advantageous for use. It is in particular an object of the invention to further develop a generic screwing tool in such a way that it can be used on live screws or nuts.

The object is solved by means of the invention specified in the claims. The subclaims do not only represent advantageous further developments of the invention specified in the main claim, but also independent solutions of the object.

Initially and essentially, it is proposed that a movable actuating element, by means of which the head can be displaced from the small distance position into the large distance position, is arranged on the handle. The actuating element can be an actuating slide, which can be shifted with respect to the handle. The handle can have a guide recess, in which the actuating slide lies. It can be provided that the actuating element has an abutment shoulder, which engages with an abutment flank of the head. The head can have two legs. The two legs can provide the head with a forked shape. One of the two legs is formed by the movable jaw and the other leg by the fixed jaw. The fixed jaw can be assigned to a jaw carrier, which is articulated in a pivotably movable manner on the handle. For this purpose, an axis in the form of a bolt can engage with bearing openings of the handle and/or of the head or of the jaw carrier, respectively. The jaw carrier can form a shaft, into which an end section of the handle protrudes. The shaft can be crossed by the bolt. A sliding section of the movable jaw can be capable of being shifted relative with respect to the jaw carrier. For this purpose, the sliding section can have a tooth gap, into which a tooth of the handle protrudes. The movable jaw carrier can be biased by a spring element, which biases the two jaws towards one another. The actuating element can have an elongate shape and can have a longitudinal side, which runs in a handle extension direction and by means of which the actuating element can be shifted. The longitudinal side of the actuating element can have handle recesses or a fluting, with which the thumb of a hand can engage, which grips around the handle, so that the actuating element can be shifted by means of thumb actuation. The actuating element preferably engages with the leg of the head, which is spatially assigned to the movable jaw. The handle can be an elongate flat piece, which has a first broad side and a second broad side facing away therefrom. Narrow sides, which face away from one another, extend between the two broad sides. The actuating element is preferably assigned to one of the two narrow sides. The narrow side or, in the case of a variation of the invention, also one of the broad sides can form the guide recess, in which the actuating element lies, which is preferably an actuating slide, and in which it can be displaced from a first position into a second position. The guide recess can be an undercut groove, into which a rib of the actuating element, which has, for example, a dovetail-shaped cross section, is mounted or inserted, respectively, or clipped, so that the actuating element is tied to the handle in a linearly movable manner. In the first position, which can be a position, which is displaced backwards, an end section of the actuating element abuts on a step of the guide recess. In a second position, which can be an actuating position, the actuating element has displaced the head from a first pivot position into a second pivot position, in which the two handle flanks of the two jaws have an enlarged distance. It is advantageous when the actuating element has an abutment shoulder, which cooperates with an abutment flank of the head. It can be provided that the abutment flank of the head is physically formed by the fixed jaw but is spatially assigned to the side of the head, on which the movable jaw is located. If the actuating element is displaced from a first position, the abutment shoulder can approach the abutment flank, until it touches the abutment flank. A further displacement of the actuating element then leads to a pivoting of the head against the restoring force of a spring element. It is thereby preferably the same spring element, which displaces the two jaws towards one another. Exemplary embodiments of the invention are provided, in the case of which the handle has a casing. The handle in particular has an electrically insulating casing, which can be formed by a plastic overmolding. As a result of this casing, the tool can be used on live parts. It is advantageous when the actuating element is electrically insulating or has an electrically insulating casing. The actuating element thereby extends largely over the region of the handle, which is encased in an electrically insulating manner. With its abutment shoulder, it can protrude beyond the electrically insulating casing in the direction of the head. The actuation of the actuating element, however, takes place at an actuating section, for example a thumb recess, which is arranged on the end of the actuating element facing away from the abutment shoulder. The screwing tool according to the invention can have an actuating slide, which has an abutment shoulder on its end facing the head, and an actuating section on its end facing away from the head.

Exemplary embodiments of the invention can have a collar. This can be a collar, which extends around the handle and which is formed by an electrically insulating casing. This collar is preferably adjacent to the end of the casing facing the head. The collar can have a guide opening, through which the actuating element protrudes. The actuating element, which is preferably inserted in a guide recess, is fixed in a slidable manner to the handle through the window formed by the guide opening.

BRIEF DESCRIPTION OF THE DRAWINGS

Exemplary embodiments of the invention will be described below on the basis of enclosed drawings, in which:

FIG. 1 shows a top view onto a broad side of an exemplary embodiment of the invention, FIG. 2 shows a top view onto a narrow side of the exemplary embodiment.

DESCRIPTION OF THE EMBODIMENTS

Figure 3:
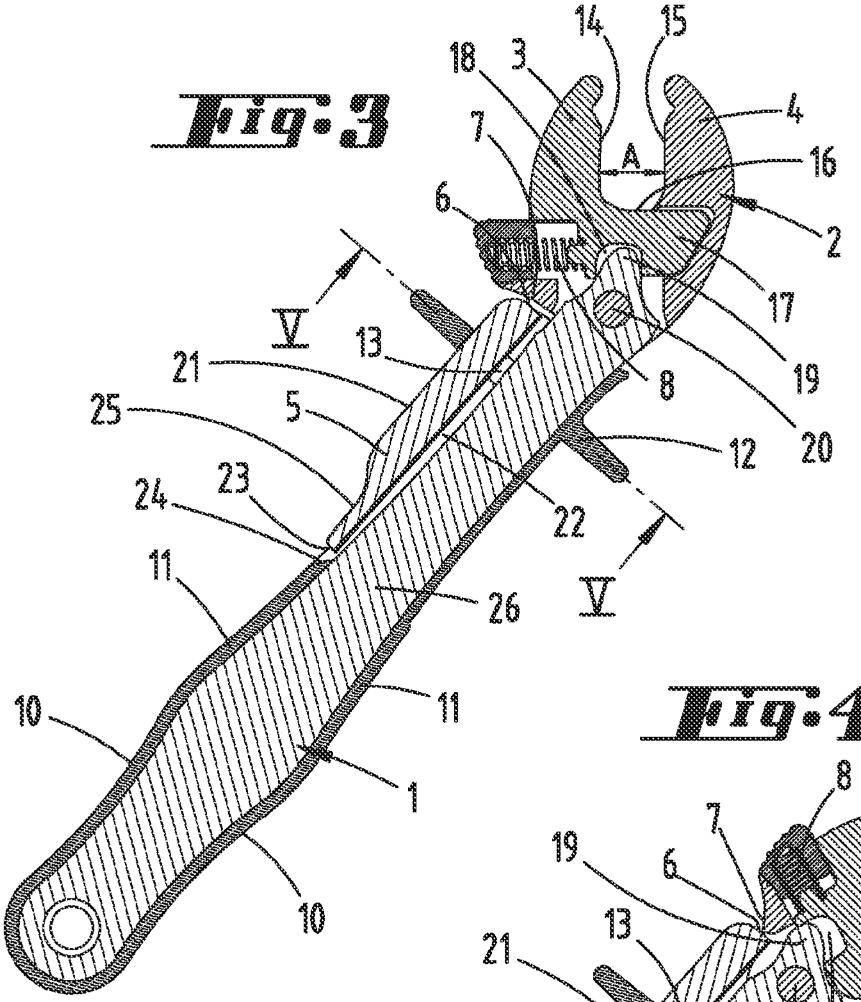
FIG. 3 shows the section according to the line III-III in FIG. 2 in a first pivot position of a head 2 with respect to a handle 1, wherein two jaws 3, 4 of the head 2 assume a small distance position.

The exemplary embodiment illustrated in the drawings is a screwing tool for rotating screws comprising a polygonal head or nuts comprising a polygonal profile, wherein the distance A between two handle flanks 14, 15 of a movable jaw 3 with respect to a fixed jaw 4 can be changed in such a way that nuts or screws with different widths across flats can be rotated by means of the screwing tool, wherein a head 2 is articulated on a handle 1 in a pivotably movable manner about a pivot pin 20 in such a way that when applying a torque on the handle 1, handle flanks 13, 14 of the two jaws in each case press with a contact pressure against the polygonal surfaces of the nut or screw.

Due to an electrically insulating casing 11 and an actuating element 5, which can be shifted along the casing 11 and by means of which the head 2 carrying the jaws 3, 4 can be pivoted accompanied by a change of the distance A, the width of the opening of the mouth formed by the two jaws 3, 4 can be changed, while the metallic head 2 simultaneously touches a live part.

The handle 1 consists of its elongate, flat metal body and has articulation end, to which the head 2 is pivotably fastened by means of a bolt, which defines an axis 20. The bolt thereby engages through bearing openings of the head 2 as well as of the articulation end of the handle. The head 2 can form a pocket, in which the articulation end, which forms a tooth 19, lies. Except for the end section, which engages with the pocket of the head 2, or the articulation end, respectively, the handle 1 is surrounded completely by an electrically insulating casing 11. The casing can be applied to the metal base body in the injection molding process. The casing can consist of plastic. The casing 11 forms a collar 12, which protrudes transversely to the extension direction of the handle and close to the articulation end. The handle forms a hand protection or a mechanical resistance, respectively, which avoids that a hand holding the handle 1 slips beyond the handle surface in the direction of the head 2.

The head 2 forms a fixed jaw 4, which is fastened in an articulated manner to the handle 1 by means of the bolt 20 forming the axis 20. The fixed jaw 4 has a handle flank 15 for engaging with a polygonal surface of a nut or the like. A sliding section 17 of a movable jaw 3 can be shifted in a direction approximately transversely to the surface extension of the handle flank 15. The sliding section 17 forms the bottom 16 of a mouth, which is formed by the handle flank 15 of the fixed jaw 4 on the one hand and by a handle flank 14 of the movable jaw 3 located opposite thereto on the other hand.

The sliding section 17 forms a tooth gap 18, with which a tooth 19 of the articulation end of the handle engages. If the handle 1 is pivoted with respect to the head 2, the tooth 19, which engages with the tooth gap 18, displaces the handle flank 14 of the movable jaw 3 with respect to the handle flank 15 of the fixed jaw 4.

By means of a spring element 8, which is formed by a compression spring in the case of the exemplary embodiment, the movable jaw 3 is biased with respect to the fixed jaw 4 in such a way that the handle flanks 14, 15 strive to approach one another. In the rest state, the distance A between the two handle flanks 14, 15 has a minimal value.

A guide recess 22 is located on one of the two narrow sides 10 of the handle 1. In the case of non-illustrated exemplary embodiments, however, a guide recess 22 of this type can also be arranged on a broad side 9. The guide recess 22 extends through a guide opening 13 of the collar 12 forming a window. The guide opening 13 holds an actuating slide 5 in the guide recess 22.

Figure 5:
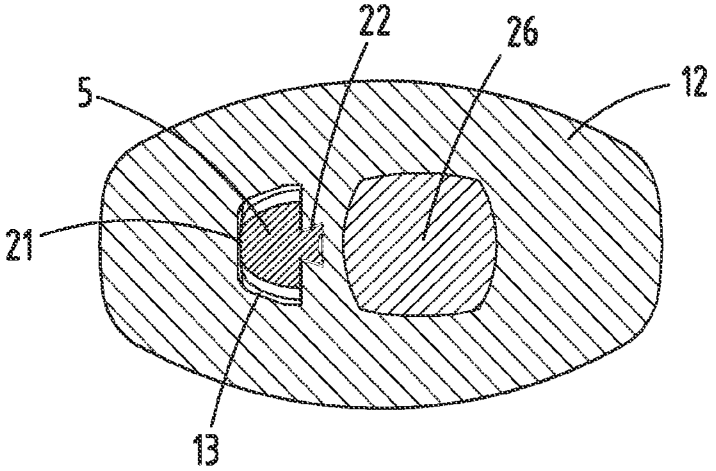
FIG. 5 shows a section according to the line V-V.
Figure 6:
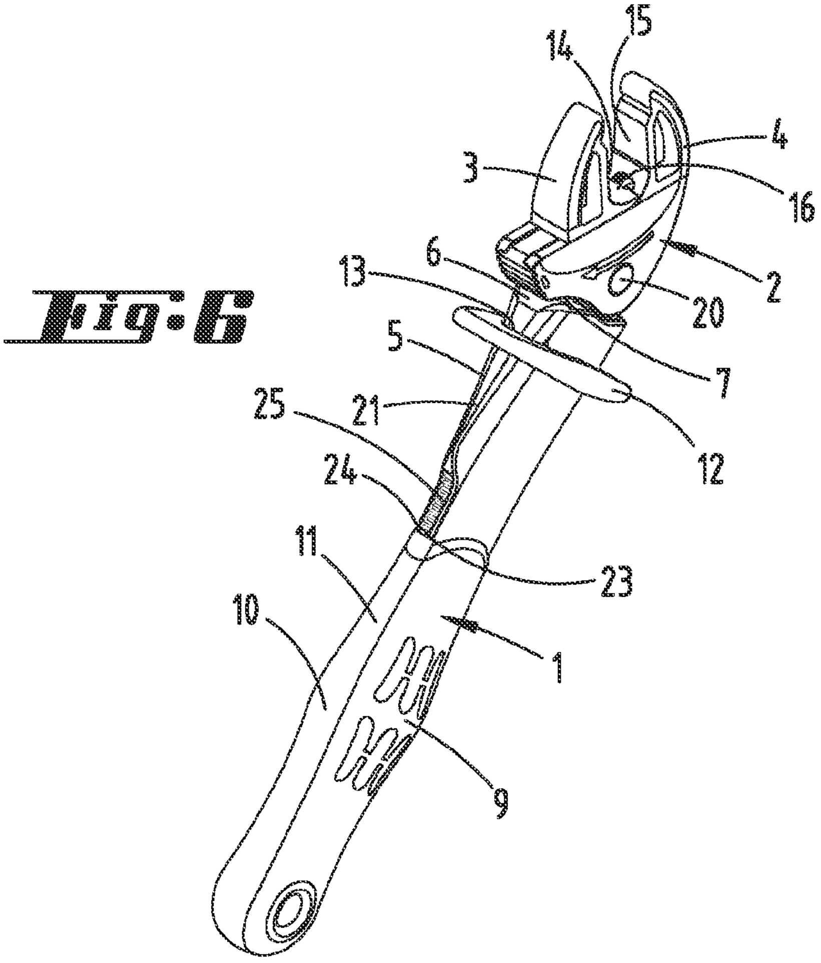
FIG. 6 shows a perspective illustration of the exemplary embodiment.

FIG. 5 shows the guide recess 22 in cross section. The guide recess can have a groove, which has undercut walls. A rib of the actuating element 5 can engage with this groove. The rib can have a dovetail-shaped cross section. The rib can be mounted in the groove, in particular the undercut groove. It can in particular also be inserted or clipped into the groove, in particular undercut groove. This takes place in order to tie the actuating element 5 to the handle only in a linearly displaceable manner. It can also be provided, however, that the guide recess only forms a depression with a non-undercut bottom.

FIG. 5 furthermore shows a metal core 26, which is overmolded with a plastic mass and which provides the mechanical stability to the handle 1.

The actuating slide 5 forms an actuating element, by means of which the head 2 can be pivoted with respect to the handle 1, in order to, accompanies therewith, enlarge the distance A between the two handle flanks 14, 15. This takes place against the restoring force of the spring element 8. For this purpose, the head 2 forms an abutment flank 7, which is arranged on the side of the head 2, on which the movable jaw 3 sits as well. The actuating element 5 has an abutment shoulder 6, which moves against the abutment flank 7 in response to a displacement of the actuating element 5, in order to pivot the head 2 thereby.

The actuating element 5 forms a section, which extends on the side of the collar 12 facing the head 2 and forms the abutment shoulder 6. A further section of the actuating element 5 extends on the opposite side of the collar 12. This section forms an actuating section 25, for example in the form of a thumb recess or a fluting, so that the thumb of a hand gripping the handle 1 can displace the actuating element 5 by engaging with the actuating section 25. In the case of the exemplary embodiment, the actuating section 25 is arranged at the end of the actuating element 5 located opposite the abutment shoulder 6. The end located opposite the abutment shoulder 6 forms an end section 23, which can abut on a step 24 of the guide recess 22 in a basic position of the actuating element 5. In the exemplary embodiment, the actuating section 25 is formed by a step or indentation of the actuating element 5.

Figure 4:
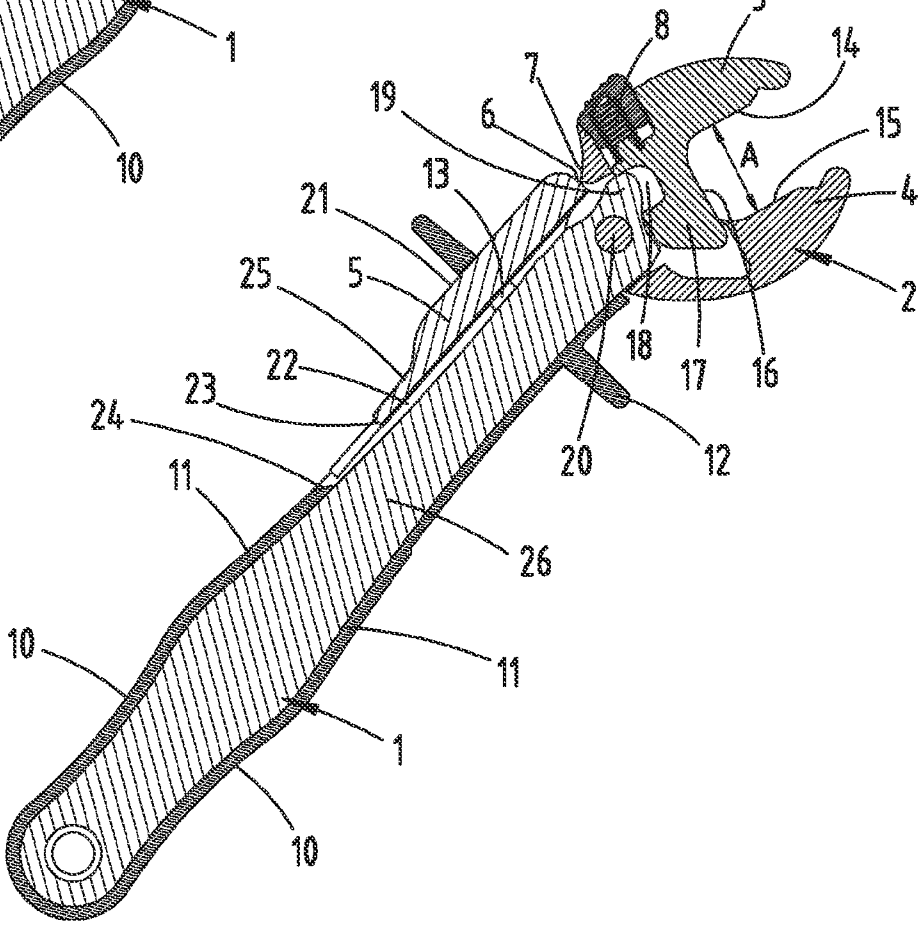
FIG. 4 shows an illustration according to FIG. 3 in a second pivot position of the head with respect to the handle 1, in which the two jaws 3, 4 of the head 2 assume a large distance position and an actuating element 5 engages with an abutment shoulder 6 on an abutment flank 7 of the head 2.

In the basic position illustrated in FIG. 3, in which the distance A has the minimum, the head 2 is guided towards the actuating element 5. In the position illustrated in FIG. 4, in which the head 2 assumes a maximum pivot position with respect to the handle 1 with respect to the basic position, the head 2 faces away from the actuating element 5. During the displacement of the head 2 from the position illustrated in FIG. 3 into the position illustrated in FIG. 4, the abutment shoulder 6 glides along the abutment flank 7. FIG. 4 shows that in the pivot end position, the abutment shoulder 6 supports a corner region of the abutment flank 7.

The elongate actuating element 5 can consist of plastic or of a metal part encased with plastic. It is in particular electrically insulating.

The mode of operation of the screwing tool is the following:

Starting at a basic position illustrated in FIG. 3, in which the distance A between the movable jaw 3 and the fixed jaw 4 has a minimum value and the head 2 is inclined towards the actuating element 5, the head 2 can be pivoted into a position, as it is shown, for example, by FIG. 4, by displacing the actuating element 5 in the direction of the head 2. In this pivoted position, the distance A between the movable jaw 3 and the fixed jaw 4 has a larger value. The opening width of the mouth formed by the handle flanks 14, 15 can also be enlarged with the help of the electrically insulating actuating element 5 when the head 2 consisting of metal abuts on a live part.

The above explanations serve the purpose of describing the inventions, which are captured by the application as a whole and which further develop the prior art at least by means of the following feature combinations, in each case also independently, wherein two, several, or all of these feature combinations can also be combined, namely:

A screwing tool, which is characterized by an actuating element 5, which can be displaced relative with respect to the handle 1 and which, during its displacement, displaces the head 2 from the small distance position into the large distance position.

A screwing tool, which is characterized in that the actuating element 5 is an actuating slide, which can be shifted with respect to the handle 1.

A screwing tool, which is characterized in that the actuating element 5 has an abutment shoulder 6, which engages with an abutment flank 7 of the head 2.

A screwing tool, which is characterized in that the actuating element 5 has an elongate shape and a longitudinal side 21 running in a handle extension direction and forms the abutment shoulder 6 with a front side.

A screwing tool, which is characterized in that the head 2 has a first leg, which is spatially assigned to the movable jaw 3, and a second leg, which is spatially assigned to the fixed jaw 4, and the actuating element 5 engages with the first leg.

A screwing tool, which is characterized in that the handle 1 has two broad sides 9 facing away from one another and two narrow sides 10 facing away from one another, wherein the actuating element 5 is arranged on one of the narrow sides 10.

A screwing tool, which is characterized in that the handle 1 has a casing 11, which is made of an electrically insulating material, and the actuating element 5 consists of an electrically insulating material or is encased by such.

A screwing tool, which is characterized by a collar 12, which protrudes from the handle 1 transversely to the handle extension direction and which has a guide opening 13, in which the actuating element 5 is guided in a shiftable manner and/or that the actuating element 5 is tied to a casing 11 of the handle in a linearly movable manner.

A screwing tool, which is characterized in that a spring element 8 arranged in the head 2 biases the fixed jaw 4 against the movable jaw 3 and biases the head 2 into a first pivot position, which corresponds to the small distance position of the two jaws 3, 4, and/or that the actuating element 5 lies in a guide recess 22, which forms a step 24, on which an end section 23 of the actuating element 5, which is located opposite the abutment shoulder 6, can abut.

All of the disclosed features (alone, but also in combination with one another) are essential for the invention. The disclosure content of the corresponding/enclosed priority documents (copy of the prior application) is herewith also included in its entirety in the disclosure of the application, also for the purpose of adding features of these documents into claims of the present application. With their features, the subclaims characterize, even without the features of a referenced claim, separate inventive further developments of the prior art, in particular in order to file divisional applications on the basis of these claims. The invention specified in each claim can additionally have one or several of the features, which are in particular provided with reference numerals in the above description and/or which are specified in the list of reference numerals. The described invention also relates to designs, in the case of which individual features of the features mentioned in the above description are not realized, in particular insofar as they are evidently dispensable for the respective intended purpose or can be replaced by other technically equivalent means.

| List of Reference Numerals | |
|---|---|
| 1 | handle |
| 2 | head |
| 3 | movable jaw |
| 4 | fixed jaw |
| 5 | actuating element, actuating slide |
| 6 | abutment shoulder |
| 7 | abutment flank |
| 8 | spring element |
| 9 | broad side |
| 10 | narrow side |
| 11 | electrically insulating casing |
| 12 | collar |
| 13 | guide opening |
| 14 | handle flank |

-continued

| List of Reference Numerals | |
|---|---|
| 15 | handle flank |
| 16 | bottom |
| 17 | sliding section |
| 18 | tooth gap |
| 19 | tooth |
| 20 | axis |
| 21 | longitudinal side, handle surface |
| 22 | guide recess |
| 23 | end section |
| 24 | step |
| 25 | actuating section, thumb |
| 26 | core |
| A | distance |

The invention claimed is:

1. A screwing tool comprising a head (2), which has a fixed jaw (4) and a movable jaw (3), a handle (1), and an actuating element (5) which is mounted in a shiftable manner in a guide recess (22) of the handle, wherein the head (2) is fastened to the handle (1) so as to be pivotable about a pivot axis (20) against a restoring force from a small distance position of the fixed jaw and movable jaw (3, 4) into a large distance position of the fixed jaw and movable jaw (3, 4) by shifting the actuating element, wherein the handle (1) has a casing (11), which is made of an electrically insulating material, wherein the actuating element (5) consists of an electrically insulating material or is encased by an electrically insulating material, and wherein the screwing tool further comprises a collar (12), which protrudes from the handle (1) transversely to a handle extension direction, wherein the collar (12) comprises a guide opening (13) and wherein the actuating element (5) is guided in a shiftable manner in the guide opening (13).

2. The screwing tool according to claim 1, wherein the actuating element (5) is an actuating slide, which is configured to be shifted with respect to the handle (1).

3. The screwing tool according to claim 1, wherein the actuating element (5) has an abutment shoulder (6), which engages with an abutment flank (7) of the head (2).

4. The screwing tool according to claim 3, wherein the actuating element (5) has an elongate shape and a longitudinal side (21) running in a handle extension direction and forms the abutment shoulder (6) with a front side.

5. The screwing tool according to claim 3, wherein the guide recess (22) forms a step (24), on which an end section (23) of the actuating element (5), which is located opposite the abutment shoulder (6), can abut.

6. The screwing tool according to claim 1, wherein the head (2) has a first leg, which is spatially assigned to the movable jaw (3), and a second leg, which is spatially assigned to the fixed jaw (4), and the actuating element (5) engages with the first leg.

7. The screwing tool according to claim 1, wherein the handle (1) has two broad sides (9) facing away from one another and two narrow sides (10) facing away from one another, wherein the actuating element (5) is arranged on one of the narrow sides (10).

8. The screwing tool according to claim 1, wherein the actuating element (5) is tied to the casing (11) of the handle in a linearly movable manner.

9. The screwing tool according to claim 1, wherein a spring element (8) arranged in the head (2) biases the fixed jaw (4) against the movable jaw (3) and biases the head (2) into a first pivot position, which corresponds to the small distance position of the two jaws (3, 4).

* * * * *